(12) United States Patent
St. Martin et al.

(10) Patent No.: US 10,594,831 B2
(45) Date of Patent: Mar. 17, 2020

(54) SOCIAL IDENTITY OF OBJECTS

(71) Applicants: Raymond Francis St. Martin, Felton, CA (US); Andrew Lee Van Valer, Scotts Valley, CA (US)

(72) Inventors: Raymond Francis St. Martin, Felton, CA (US); Andrew Lee Van Valer, Scotts Valley, CA (US)

( * ) Notice: Subject to any disclaimer, the term of this patent is extended or adjusted under 35 U.S.C. 154(b) by 955 days.

(21) Appl. No.: 15/080,028

(22) Filed: Mar. 24, 2016

(65) Prior Publication Data

US 2017/0024485 A1 Jan. 26, 2017

Related U.S. Application Data

(60) Provisional application No. 62/138,666, filed on Mar. 26, 2015.

(51) Int. Cl.
*H04L 29/08* (2006.01)
*G06F 16/43* (2019.01)

(52) U.S. Cl.
CPC .............. *H04L 67/32* (2013.01); *G06F 16/43* (2019.01); *H04L 67/12* (2013.01); *H04L 67/22* (2013.01); *H04L 67/02* (2013.01)

(58) Field of Classification Search
CPC ..... G08B 13/19; H04L 67/16; H04L 67/2861; H04L 67/2809; H04L 67/10; H04L 67/32; G06F 8/34; F24D 13/00
See application file for complete search history.

(56) References Cited

U.S. PATENT DOCUMENTS

| | | | |
|---|---|---|---|
| 8,086,960 B1* | 12/2011 | Gopalakrishna | G06F 16/986 715/266 |
| 8,433,136 B2* | 4/2013 | Epshtein | G06K 9/00711 382/176 |
| 8,914,024 B2* | 12/2014 | Alharayeri | H04L 67/16 455/434 |
| 9,224,277 B1* | 12/2015 | Kelly | G08B 13/19 |
| 9,661,065 B2* | 5/2017 | Doshi | H04L 67/10 |
| 2006/0149776 A1* | 7/2006 | Lin | G06F 16/00 |
| 2007/0203911 A1* | 8/2007 | Chiu | G06F 16/40 |
| 2008/0140719 A1* | 6/2008 | Chaney | H04L 51/24 |
| 2010/0042511 A1* | 2/2010 | Sundaresan | G06Q 10/10 705/26.1 |
| 2010/0114746 A1* | 5/2010 | Bobbitt | G06Q 30/06 705/35 |
| 2012/0237913 A1* | 9/2012 | Savitsky | G09B 23/286 434/262 |
| 2013/0259456 A1* | 10/2013 | Viswanathan | F24D 13/00 392/407 |
| 2014/0040043 A1* | 2/2014 | Barron | G06Q 10/00 705/14.66 |
| 2014/0040119 A1* | 2/2014 | Emmerson | G10H 1/0025 705/39 |

(Continued)

*Primary Examiner* — Etienne P Leroux
(74) *Attorney, Agent, or Firm* — Donald R. Boys; Central Coast Patent Agency LLC

(57) ABSTRACT

A system incorporates an Internet service storing descriptions, locations and circumstances for virtual objects, creating a virtual world mirroring the real world, with each virtual object associated with a unique code enabling quick search and identification of the virtual objects. The system in some implementations allows search and data mining as well as associating virtual objects with the user that creates the virtual object.

13 Claims, 10 Drawing Sheets

(56) References Cited

U.S. PATENT DOCUMENTS

| | | | |
|---|---|---|---|
| 2014/0081798 A1* | 3/2014 | Millstone-Shroff | G06Q 30/02 705/26.7 |
| 2014/0222775 A1* | 8/2014 | Zohar | G06F 16/735 707/709 |
| 2015/0067057 A1* | 3/2015 | Brekke | H04L 67/02 709/204 |
| 2015/0095882 A1* | 4/2015 | Jaeger | G06F 8/34 717/109 |
| 2015/0142968 A1* | 5/2015 | Bhagwat | H04L 67/16 709/224 |
| 2015/0195365 A1* | 7/2015 | Choi | H04L 67/16 715/739 |
| 2015/0222490 A1* | 8/2015 | Salam | H04L 67/2809 709/224 |
| 2016/0065653 A1* | 3/2016 | Chen | H04L 67/10 715/735 |
| 2016/0191673 A1* | 6/2016 | Bohannon | H04L 67/2861 709/213 |

* cited by examiner

SOCIAL IDENTITY OF OBJECTS

CROSS-REFERENCE TO RELATED APPLICATIONS

The present application claims priority to Provisional Application Ser. No. 62/138,666 filed Mar. 26, 2015, titled "Social Identity of Objects". All disclosure of the prior application is incorporated at least by reference.

BACKGROUND OF THE INVENTION

1. Field of the Invention

The present invention is in the technical area of information management and pertains more specifically to apparatus and methods for creating a social identity for an object or a collection of objects, and associating that object in a comprehensive information system with specific persons and descriptive and contextual information.

2. Description of Related Art

The Internet network is well-known, and comprises a great number of network nodes, each typically coupled to specific functionality and information. There exist and are well-known as well, browser applications that enable persons through the use of computerized appliances to search for nodes according to specific search criteria, and to connect to and interact with individual nodes, including downloading of information in repositories coupled to the nodes. Applications and systems exist in the art as well for individuals to create nodes in the Internet network, commonly referred to as web sites.

A relatively new concept in the Internet network is known as the Internet of Things, referred to as IoT. In the IoT individual apparatus may be enabled as nodes in the network by implementing network communication hardware and software in such apparatus, and the apparatus and its communication subsystem may have an IP Address.

Having an IP address is not a new concept for an apparatus, as this is quite common for network capable devices like computers and routers. But in the IoT the nodes are such as automobiles, other vehicles, refrigerators, TV sets, and much more. A commonality among the "things" in the Internet of Things, is that the things are enabled to connect to the Internet network.

It has occurred to the present inventors that the node concept may be extended far beyond the IoT concept in a non-obvious way. In the IoT each apparatus or entity that is enabled as a node may be described as a noun, a refrigerator for example. An important object in the IoT is that the nodes are interactive in the Internet network. That is, one may associate all appliances in her home as IoT nodes, and may exercise considerable interaction and control throughout the population of appliances. But other than being, for example, a refrigerator or a spa filter, there is no rich contextual information and association. There is little if any motivation in the IoT to represent a book, a guitar, a settee, a stagecoach, an article of clothing, ad infinitum, as nodes in a network with specific identification. The present inventors have imagined that assigning unique ID to such objects and assemblies of objects opens a door to rich contextual association among the objects, history of the objects in association with living and formerly living people, stories about the objects and the people in association, and much more. Objects, by functionality of the system, are enhanced with personality.

In the Detailed Description of this invention below, through specific examples and embodiments, the inventors describe a new and unique system based on Social Identity of Objects.

BRIEF SUMMARY OF THE INVENTION

In one embodiment of the invention a system is provided comprising an Internet-connected server having a coupled data repository, the server executing software by a processor from a non-transitory physical medium, one or more interactive interfaces presentable by the server on a display screen of network-connected computerized appliances, a database enabled by the software storing data describing virtual objects in the data repository in a structured manner, a registration process enabled by the software whereby persons using individual ones of the Internet-connected computerized appliances are registered as members of the system with log-in and identifying information, an instantiation process provided by the first software enabling instantiation of virtual objects in the database by registered members from the network-connected computerized appliances, wherein a user is enabled through one of the interactive interfaces to propose a new virtual object for instantiation by entering at least a name and a description for the new object, the system determines by comparison with stored information about virtual objects in the database if the proposed object is in fact new to the system, and if so associates a unique instantiation code with the new object, instantiating the new object in the data repository, and a search process provided by the first software enabling registered members to search for virtual objects in the database from the network-connected computerized appliances, to access information about the virtual objects when returned in the search process, and to edit the information about the virtual objects under particular circumstances. Every virtual object instantiated is associated uniquely with the registered user who first instantiated that object, and privileges in controlling information about that object are reserved for the instantiating registered user.

In one embodiment of the invention information about virtual objects stored in the data repository comprises object description by one or more of audio files, text files, photographs, and videos, object history including owners and stories about the instantiated objects. Also in one embodiment structured associations are made and recorded between objects and other objects, and between objects and registered users. Also in one embodiment emotions are associated with objects. Also in one embodiment an object instantiated and associated with a unique code is composed of other virtual objects themselves associated with unique instantiation codes and having unique descriptions.

In one embodiment the system further comprises a process enabled by the software by which the system associates instantiated virtual objects in the data repository with objects in the real world having the same or similar description, periodically tracks information and circumstances regarding the real-world objects, and updates information regarding the instantiated virtual objects in the data repository with the information and circumstances in tracking the associated real-world objects. Also in one embodiment tracking circumstances includes noting geographic position and movement of real-world objects and storing that information associated with the instantiated virtual objects. Also in one embodiment tracking circumstances includes transactions occurring between real-world objects, and noting and storing the tracked transactions between the associated instantiated virtual objects. In one embodiment the system further comprises a process mining data regarding position and movement of instantiated virtual objects, processing the data in a variety of ways, and presenting the processed data to registered users. And in one embodiment the system further comprises a process mining data regarding transactions between instantiated virtual objects, processing the data in a variety of ways, and presenting the data to registered users.

In another aspect of the invention a method is provided comprising executing software by a processor from a non-transitory physical medium at an Internet-connected server having a coupled data repository, presenting one or more interactive interfaces by the server on a display screen of network-connected computerized appliances, storing data describing virtual objects by a database in the data repository in a structured manner enabled by the software, registering persons using individual ones of the Internet-connected computerized appliances as members of the system with log-in and identifying information, instantiating virtual objects in the database by registered members from the network-connected computerized appliances, instantiation involving a user proposing through an interactive interface a new virtual object for instantiation by entering at least a name and a description for the new object, determining by the system by comparison with stored information about virtual objects in the database if the proposed object is in fact new to the system, if the proposed object is in fact new, associating a unique instantiation code with the new object, instantiating the new object in the data repository including the name and description, searching by information criteria for virtual objects in the database from the network-connected computerized appliances, accessing information about virtual objects returned in the search process, and edit the information about the virtual objects under particular circumstances, associating every virtual object instantiated uniquely with the registered user who first instantiated that object, and assigning privileges in controlling information about objects to the instantiating registered user.

In one embodiment of the method information about virtual objects stored in the data repository comprises object description by one or more of audio files, text files, photographs, and videos, object history including owners and stories about the instantiated objects. Also in one embodiment structured associations are made and recorded between objects and other objects, and between objects and registered users. Also in one embodiment emotions are associated with objects. Also in one embodiment an object instantiated and associated with a unique code is composed of other virtual objects themselves associated with unique instantiation codes and having unique descriptions.

In one embodiment the method further comprises a process enabled by the software by which the system associates instantiated virtual objects in the data repository with objects in the real world having the same or similar description, periodically tracks information and circumstances regarding the real-world objects, and updates information regarding the instantiated virtual objects in the data repository with the information and circumstances in tracking the associated real-world objects. Also in one embodiment tracking circumstances includes noting geographic position and movement of real-world objects and storing that information associated with the instantiated virtual objects. Also in one embodiment tracking circumstances includes transactions occurring between real-world objects, and noting and storing the tracked transactions between the associated instantiated virtual objects. Also in one embodiment the method further comprises a process mining data regarding position and movement of instantiated virtual objects, processing the data in a variety of ways, and presenting the processed data to registered users. And in one embodiment the method further comprises a process mining data regarding transactions between instantiated virtual objects, processing the data in a variety of ways, and presenting the data to registered users.

BRIEF DESCRIPTION OF THE DRAWING FIGURES

DETAILED DESCRIPTION OF THE INVENTION

Figure 1:
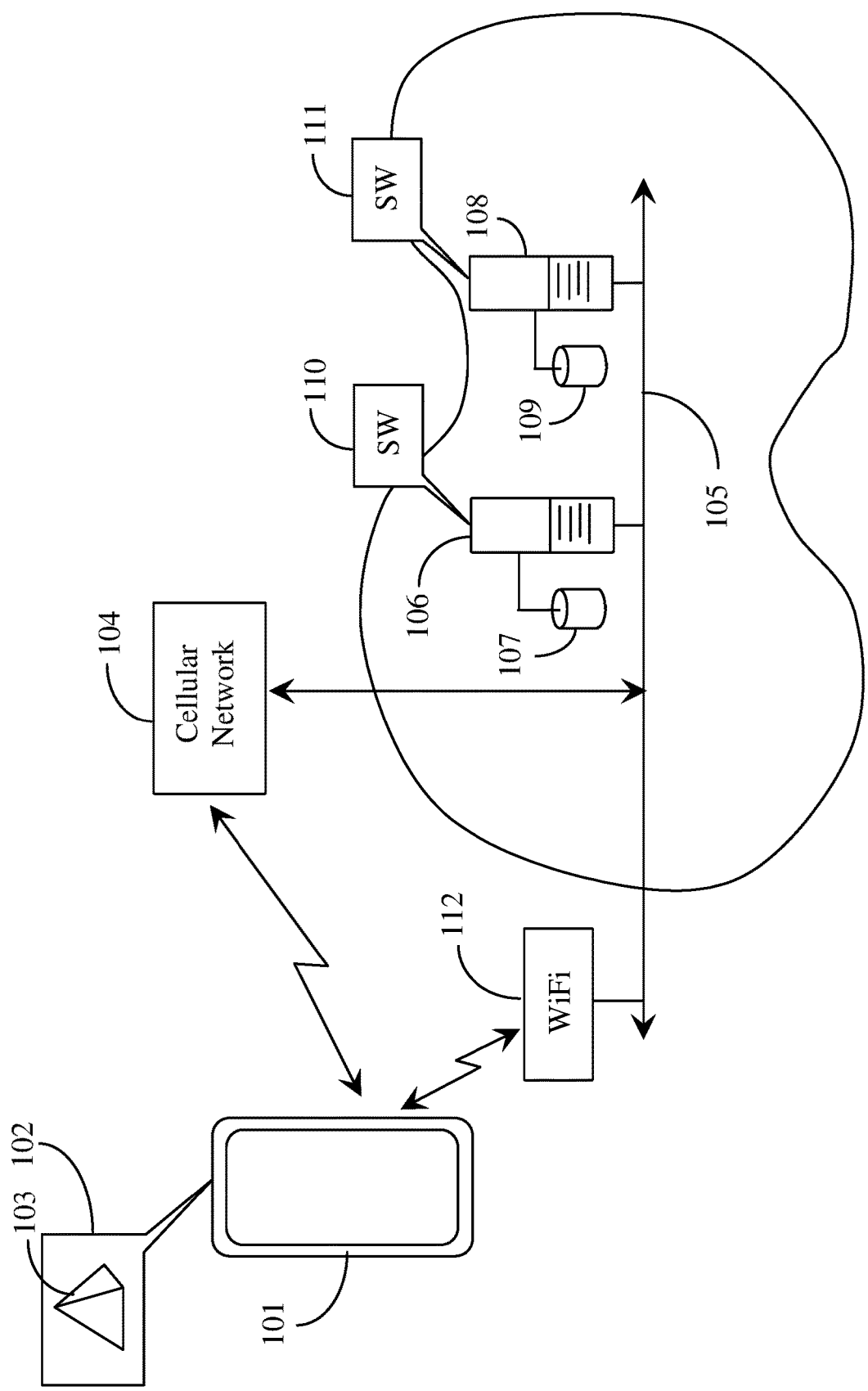
FIG. 1 is a simple architectural diagram illustrating one embodiment of the invention.

In an embodiment of the invention an object embodying some level of intrigue or importance to one or more persons is registered (instantiated) with a service of the invention, the object receiving a unique code printable or otherwise displayable on the object or on a sticker or identifier placed on, in or otherwise associated with the object being registered. As will become clear in further description below, some objects may be so very well-known that there would be no need to physically associate the object with a physical indicia of the unique code associated with the object. For example, the city of Washington, D.C. is so well-known that it would never be confused with another city, so, if the City of Washington D.C. were to be instantiated as an object in an embodiment of the invention, the city would be assigned a unique code, but it would not be necessary (nor indeed possible) to affix a sticker or other physical indicia to the city.

The code in embodiments of this invention is henceforth termed an SIO code. The SIO code may be machine-readable and may in some embodiments be captured using an imaging mechanism of a mobile telephone for example. In one embodiment the code may be used to retrieve information about the object over the Internet network, including associations with persons, with other objects, with stories, with time windows, and with a broad variety of other criteria. The code may be embodied to be transferrable in a bar code or a QR code.

In one embodiment of the invention it is important that the code be unique to the particular object with which it associated, and given the potential number of objects that might be identified in this way, the code needs to be of a nature that a very large number of different unique codes may be generated.

One way such codes may be generated and used is simply by a binary string of sufficient length. An example is the 128-bit nature of IPV6 code now used for Internet IP addresses. A 128-bit binary sequence provides $2^{128}$ unique designations. This is 340,282,366,920,938,000,000,000,000,000,000,000,000 designations. This is $2^{52}$ addresses for every observable star in the known universe, or $2^{95}$ addresses for each of the about 6.5 billion persons alive today. This is enough to assign a unique address to every atom on the surface of the Earth, with enough left over to do every atom on another 100+ planets. This should be enough.

It is not, of course, necessary that a 128-bit binary number be readable somehow from an object tagged with one such number. The bit sequence may, of course, be rendered by use of hexadecimal notation, as it is in IPV6, or in any of several other ways to be a much shorter and less complicated rendition, perhaps by scientific notation, for example, which may, upon entry of capture, be translated in any other convenient way. There are many shorthand ways of expressing large numbers, and any and all may be useful in embodiments of the invention. It is important that the code be unique and that it be associated with a single object or entity, and that it be embodied in a way that is easy to capture and/or enter into an Internet-capable device.

At this point it is important to understand that an object associated with a code in an embodiment of the invention need not be an atomic object, as in the case of the city of Washington, D.C. mentioned above. The coded object may be composed of many other objects, which may each bear or be uniquely associated with (or not) an SIO code. As a simple example, consider the Empire State Building in New York City. For that matter, consider New York City as an example, and the Empire State Building as a lower hierarchical component of New York City. One or both may be assigned an SIO code. Further, many other buildings (and streetlamps) in New York City may be tagged with an SIO code. Different floors of the Empire State Building may be uniquely tagged as well, and thousands of other objects in the Empire State Building may be uniquely tagged.

In this grand scheme of things, the skilled person will see that the SIO codes may be nested in a hierarchical scheme such that codes recorded in memory in a system of the invention may be associated hierarchically in a parallel manner to the manner that the real objects are associated in the real world. And it should be noted that the word "objects" in this sense is used in a broad context, so buildings and battleships, for example, may be objects with an SIO code, and components of the buildings and battleships may have separate unique SIO codes. It is intended in one embodiment that any object entity that has mass may be a candidate for an SIO code. In some embodiments of the invention provision is made for SIO codes assigned to virtual entities, that is, to ideas that have no mass, but are instantiable in the minds of persons who may avail themselves of services of the invention.

An example of a virtual entity might be the Angel Gabriel. The idea of the angel is not known in the annals of science to be a specific object having mass and occupying space, but is most certainly an entity that may be invested with characteristics and qualities in the minds of human beings. In an embodiment of the invention allowance is made for such entities, which may be instantiated with SIO codes, and associated with persons, belief systems, religious organizations, time windows in history, stories provided by members of a service in an embodiment of the invention, and more.

FIG. 1 is a simple architectural diagram illustrating one embodiment of the invention. An object 103 is illustrated in FIG. 1, and represents one of a very large number of objects that may be uniquely associated with (instantiated by) an SIO code in embodiments of the present invention, in the broad sense of objects as described above. A mobile communication device 101 having an image-capturing capability may be used in various embodiments, and is shown in this representation as imaging object 102 in image field 102. Mobile device 101 may be, for example, a cellular telephone, a pad device, or any other mobile, computerized device that incorporates image capture. Device 101 is enabled to connect to the Internet network, illustrated here as Internet backbone 105 representing all of the networks and sub-networks and interconnections that make up the Internet network, through either a local WiFi network 112 or through radio communication on a cellular network 104, either of which may gateway to Internet backbone 105.

Two Internet-connected servers 106 and 107, coupled respectively to data repositories 107 and 109 are shown, both executing respectively software (SW) instances 110 and 111, which provide functionality for the servers. One or both may be enabled to provide functionality and services to users as described in enabling detail below in embodiments of the present invention.

Assume for example that server 106 provides functionality for users in embodiments of the invention. Server 106 may in embodiments provide, through execution of SW 110, one or more web sites with one or more pages servable to users, who in many embodiments will be registered members of the SIO system, and will have user profiles, including history of activity with the system of the invention and with objects registered with the service.

In one embodiment a registered user may wish to socially instantiate an object in the system of the invention, which, because every object social instantiation is unique, and association is made between the object and a unique object code, as described above, may be done only once. In embodiments of the invention a formalized process is provided for object social instantiation.

Figure 2:
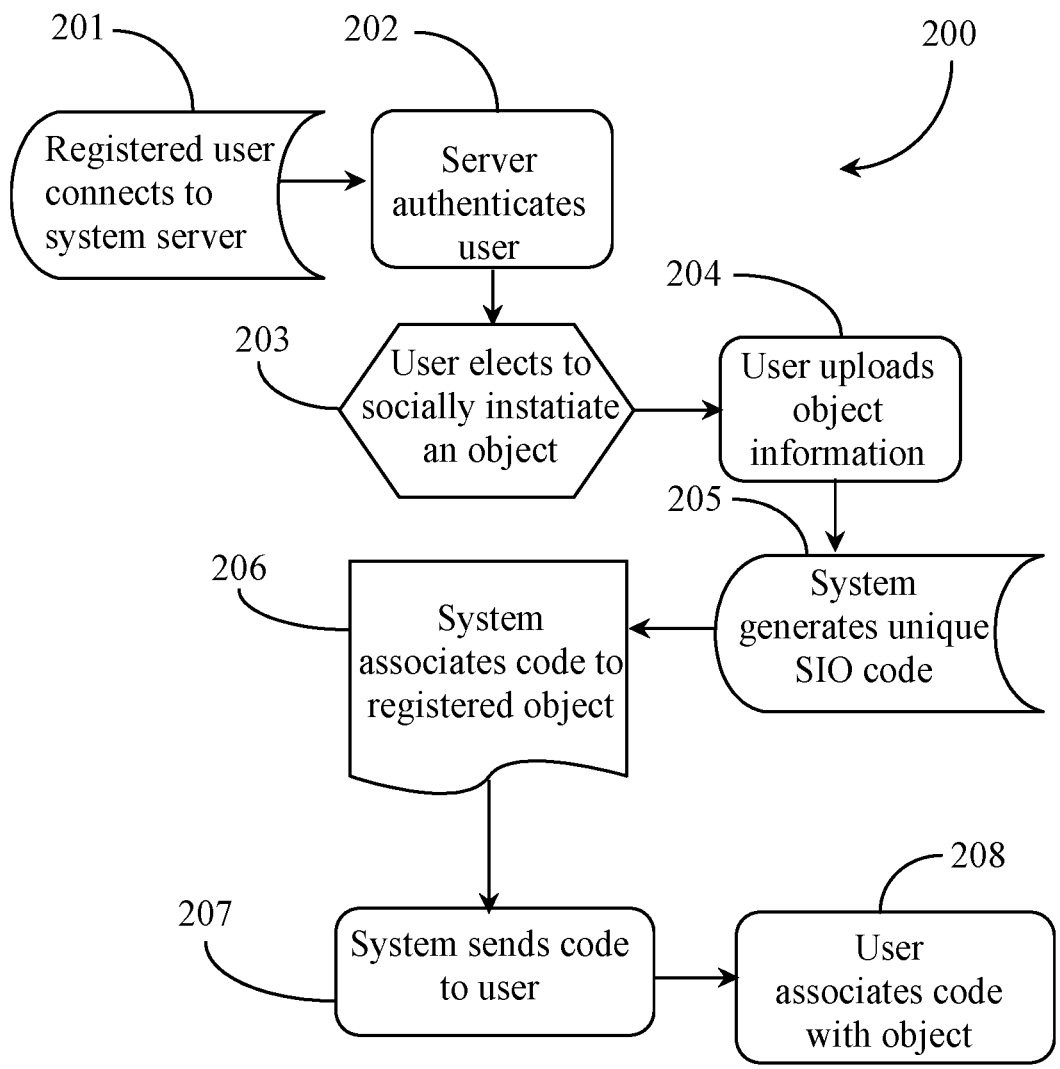
FIG. 2 is a flow chart illustrating an exemplary process for social instantiation of an object in an embodiment of the invention.

FIG. 2 is a flow chart illustrating an exemplary process for social instantiation of an object in an embodiment of the invention. At step 201 a registered user connects to system server 106. Server 106 authenticates the user through functionality provided through execution of SW 110. The server presents an interactive interface by a browser application on the user's device, which enables the user to select from a variety of activities, and in this example the user elects at step 203 to socially instantiate an object.

At step 204 the user identifies the object to be instantiated, and uploads information about the object to the server. This information may be of many sorts, and may in some instances be quite extensive. The user may photograph the object, create video of the object, and may enter any amount of textual information or recorded audio regarding the object. In one embodiment this object information, which may include extensive contextual information, such as where the object is presently, where the object has been, where how and when the object has been associated with specific persons, and so forth, is stored temporarily while the system attempts to determine whether the object in question may already be instantiated with an SIO code and related information in databases coupled to the server. It is important to understand that this uploading of information is not a one-time process. Once an object is instantiated with a social identity the instantiating user, and indeed other users, may upload more information over time at different points in time.

If the system determines to the best of information available that the object in question has not been instantiated with a social identity, the system selects a unique SIO code at step 205. This step may, in some embodiments, have other levels of intelligence. For example, objects having social identity may be, as described above, assemblies or collections of other objects. An example is a residence, which may be instantiated by a user with social identity, but will certainly comprise a considerable number of other objects, such as the roof, a fireplace the back driveway, a box in the attic, and so on. As a simplistic example, a registered user may in the illustrated process, be instantiating a carpet in her living room with a social identity, and the system may discover that the living room itself, and the residence as well already have been instantiated and have a unique SIO code. In this case immediate association will be made in a nested, hierarchical manner, between the new SIO code being assigned to the carpet, and the SIO codes of the living room and the residence. Since the address of the residence is already known in this example, because the residence is already instantiated with social identity and code, the city or town, County, State, Country, planet, and so on may also be known, and may be socially registered as well. Codes in such cases will be hierarchically nested, and in some cases, whether or not the town or state, for example actually has an SIO code.

The nesting association described immediately above will in some embodiments be accomplished by tagging. In one embodiment it is the assigned code that is tagged. One important tag in this embodiment will be object description. In step 204 described above among the items of information that a user may upload to the system at time of instantiation is a physical description of the object, which in the case of objects that are not virtual, will usually include one or more images or video sequences.

In an embodiment of the invention data structure is provided such that each SIO code assigned will have a substantial list of tags. One of these is object description. Others may be an object history, which may include a time when the object came into being (birth of the object). A chair for example will have been manufactured or made by a person. The history may be extensive. Another tag may be association with people, which may or may not be member users of the system of the invention. A very important aspect of the invention is this association of objects, characteristics of objects, history, stories about objects, and so forth, which is described in more detail below.

It will be apparent to the skilled person that some contextual information for some objects may be fluid in nature. For example, a user may register a personal aircraft, or a locomotive, for example. Location on the planet may be known at the time of registration and assigning a unique SIO code, but as time passes the location may change drastically. In some embodiments the system may have functionality for periodically or continually updating contextual information regarding many objects, such as by accessing data from other Internet-connected sites like server 108 of FIG. 1, which might be a server hosted by an airline, for example.

Once the system has generated or assigned a unique SIO code to the object in question, the system associates that code and all of the information regarding the object in a database for the purpose in repository 107, at step 206, creating an object profile. The information will in some embodiments also comprise current ownership, and a history of ownership, if any. Importantly, in many embodiments the system also associates the registering user to the object as the first to have registered that object socially. In many embodiments this affords special privileges to that user regarding that object, and may open unique controlling functionality for the user, which is described further below.

At step 207 the unique SIO code assigned is sent to the registering user. For exemplary purpose, assume that the codes assigned are 128-bit binary, as in ipV6 address notation. In this instance the code sent may be the hexadecimal notation of the 128-bit binary, which reduces each sequence of 16 bits to a sequence of four letters and/or numbers. This will be a code with a maximum of 32 characters. In other embodiments the 128-bit binary may be rendered by the system as a base-10 number, and then rendered in scientific notation as a decimal number and a factor of ten. There are a variety of different ways that the full representation of the code may be reduces to an abbreviated form that may allow transmission and use by users of codes that are more manageable than 128-bit binary.

In some embodiments registered users will be enabled through software executing on the user's computerized appliance to have a local data repository where SIO codes instantiated by that user are stored, as well as at least partial information of associations of the codes as stored in the system repositories on the server side.

In various embodiments there are a variety of ways that the system may enable users to physically affix a code to the object registered. The system may provide, for example, the SIO code as a bar code or a QR that may be printed on the object or printed on a tag or other physical identifier that may be affixed to the object. In many cases the user may store the code received from the system, and may not affix the code in any manner to the object that was registered to have social identity. Consider, for example, that a registered user is the first to instantiate the one moon of the planet Earth to the system to have a social identity. The user may receive the assigned SIO code, but may have difficulty attaching the code to the moon. Nevertheless, the system knows that there is but one moon for the planet Earth, and there should be no confusion in the matter in functions in embodiments of the invention.

It will be apparent to the skilled person that a substantial number of objects may be instantiated to the system as having a social identity, and may be assigned unique SIO codes. Information, including image, textual and audio information, as well as contextual information, may be uploaded to the system to be stored and usable regarding the objects registered. Very significantly, contextual information may also include association of registered users and other users to objects registered. That is, the original registering user may in some embodiments be associated in a high profile way to the objects that that user instantiates. But the original user may associate other users with the object, or other users may be associated by the system by functionality encoded as machine intelligence in the system. For example, in one embodiment the system associates with the Facebook™ system, perhaps through an API, and when a registered user instantiates an object, that user's first degree friends in Facebook™ may automatically be associated with the object as well. In this case there may be functionality for the friends to dis-associate if they wish. The same sort of automatic association may be made for other social network sites where individuals may have associations with others.

An important issue in embodiment of the invention is that each object instantiated as having a social identity is actually unique. That is, the same object has not been previously instantiated and assigned an SIO code. It was described above that the system, at the time of registration of an object determines to the best of its ability at the time whether the object already has been instantiated and has an SIO code. The process of ensuring unique instantiation, however, is an ongoing process, and the system may determine at some time after an object is registered that the object is, in fact, not unique, and may have been previously registered. In this ongoing process correction and adjustment may be made, with appropriate notification to members.

As a result of the substantial social instantiation of objects and association with information, including contextual information and personal association of persons and other objects, a great deal of information may be stored and cross-referenced, and made accessible to users and enterprises.

Referring once again to FIG. 1, device 101 may be a computerized device under control of a user of the system of the invention, and may be in this example any sort of computerized device having Internet access and I/O capability. Object 103 is in this example an object that has been previously registered as having a social identity, and was at the time assigned a unique SIO code. The object also has, by virtue of having been instantiated as having a social identity, associated with the object's code in the system, considerable associated image, textual and audio information, as well as rich association with other objects and persons, both registered and not registered, all of which is recorded in a dB in repository 107.

A registered user may interact with the system of the invention through functionality provided by SW 110 executing on server 106 to access, review and download stored information regarding object 103, and may upload more information regarding that object, which the system will add to the already stored and associated information. This interaction may occur in a variety of ways in various embodiments of the invention.

One mode of interaction may be through an SIO code that may be somehow affixed to object 103, and which may be imaged by the user via image-capture capability 102 of device 101. A user may focus the imaging apparatus on object 103 and capture the SIO code as a QR code, which in one embodiment will initiate connection to the Internet and to server 106, displaying an interactive interface to the user, with capability for the user to review all of the associated information of object 103, perhaps incrementally, and all of the contextual information, including association with other objects and persons who may or may not be registered users of the system.

In one use case, an instantiated object might be, for example, a museum artifact connected to previous locations and curators tracked back to discovery of the object. A connected user might be a student who discovered the object. Objects may be related in a variety of ways, such as being individual paintings of a set of paintings, or individual bone types of a dinosaur skeleton, etc. There are many, many possibilities.

In one aspect a user that owns a coded object might be interested in who owns other existing copies or originals of the same object that make up a set of the objects such as a series of painting by a same artist, or a collection of compact discs of a same musician band or composer. In one aspect, the object might be a virtual object or a copy of a real object held in seclusion or not generally available for public viewing. Members or public visitors such as member 704 may access rich information.

The information store and association for a socially instantiated object may be very rich and varied. As a single example a user may register a vintage musical instrument, a guitar, for example, once owned and used by Willie Nelson. That guitar may be associated in the data repository with a new owner of the guitar, who may be the person registering the guitar. It may also be associated with other owners, and with extensive data about Willie Nelson, relating, for example, to concerts where Willie Nelson used that guitar. Associations may also be made to similar guitars (perhaps the same make or type) owned or used by others. Intricate relationships between persons and objects and other persons and other objects, replete with stories and histories, may be made. A user might, for example, through the guitar object, find and communicate with other persons who were in attendance at a particular venue where Willie Nelson played that guitar.

As another single example an object might be a bench, a seat in a stadium, or other fixed location hosting the object in a fixed position. The code of the object in this case may provide information about actions that object has "witnessed". For a stadium seat, for example, a home run may have landed there. A dignitary might have sat there for an event.

It will be apparent to one with skill in the art that the contact brokering system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

In some embodiments of the inventions enabled in this specification the identifying mechanism may be other than an indicia or member number. In some cases electronic devices, similar to the chips used in pet identification, may be used, and a member's mobile device may be enabled to connect to the electronic chip wirelessly, or by contact, and to retrieve the unique SIO code, and use that SIO code to access data in the network, such as the website of a service according to an embodiment of the invention. In this aspect the service in an embodiment of the invention, when a new person or object is registered, may assign a unique SIO ode, and that SIO code may be encoded in an electronic device rather than printed on a decal or the like, or both. The electronic devices may be provided in many different forms that may be added to or embedded in objects.

In one embodiment of the invention an interactive interface provided by the system to a registered user may enable that user, reviewing associations of a socially instantiated object with persons, to communicate with one or more of the associated persons. In some embodiments users may be enabled to authorize or deny such communication or provision of contact information. In one embodiment a person's contact information may not be provided, but a communication may be left for the person at the network site, and the system will notify the person that there is a communication to retrieve.

Also in one embodiment there may be a service for users who own socially instantiated items to sell or trade these items with other users. This service is integrated with the communication system in that offers for sale, buy or trade may be made to other users, or in general, and may be published in a variety of ways. A potential seller may, for example, advertise an item for sale with a price and time or other terms, and instruct the offer to be made only to a subset of other registered users who may be identified by the system from profile information, for example. A transaction system, including collecting and paying money and other value may be a part of the system as well.

In one embodiment of the invention, a variation of the coding scheme allows the system to assign a window of sequential (serial) codes to an object, and the forward progression of codes in the window are to represent the object at different points in time over a period of time. The first code of the serial window identifies the object at the time the object first enters the social universe as an instantiated object. The next 365,000, for example, in the overall series are now reserved for the same object and represent the same object incremented in age from AE (after entry) in one day increments for a thousand years. Now, anytime someone references that object in the system the id is incremented by the delta-days from AE. The example, of course, is subject to bending and stressing according to need.

In some embodiments of the invention the code assigned to a socially instantiated object may be assigned and stored in the system, with all of the information and association described above, but there may be a variety of ways that that code, once transmitted to a user, may be rendered and used for identification of objects. For example, a code may be rendered as light or variations in light, and as such, may be communicated from an object to a person seeking the code for the object. Consider a case where a reflector may be attached to an object such that impinging white light may be reflected in a range and ordered sequence of wavelengths (colors). A capturing device might have a locally executed program, compatible with SW at the system site, that could process the color sequences and translate same to the SIO code in the manner stored at the system site. A QR code might also employ color.

In other embodiments sound and sound sequence may be used to tag an object, and to communicate code by the object to interested persons. In one embodiment a binary sequence may be rendered by a series of very closely spaced lines in a surface, the lines having at least some slight depth into the surface. In this scheme there is a standard separation distance, assume 1 decimeter. So two vertical lines side by side represent two binary one's side by side at that position in the sequence. If there is no adjacent line at 1 decimeter from another, then there is an intervening binary zero at the position. A binary sequence of 128 bits may then be represented by these lines lake a bar code, but in this case the code is read by dragging a wand across the line sequence in an agree-to direction, producing a sound that may be captured by a device's microphone and rendered by an app on the device back to the SIO code. So codes in or on objects do not have to be QR or bar codes, they might be light emitted or sound embodied codes that may be translated as needed to the SIO code. In sound, pitch and frequency are also usable for variation for coding and code communication.

In one embodiment of the invention a mechanism is provided in the instantiation of objects by members enabling the member to classify the new object or the associated manager of the object as Anonymous, Public or Restricted. If the member selects Anonymous as a category for the object, the nature of the object will be searched, as described above, to try to establish that the object is not redundant. The member in this particular case can attach information to the object, but the member in some circumstances might not be associated with the object. In other circumstances the member who instantiates the object might be associated with the object, but the association may be hidden from other members, or at least a sub-set of other members. In various aspects of the invention information related to an object may be completely anonymous, may be completely public, or may be restricted in a variety of ways.

If the member selects Public as a classification, the nature of the object will be searched, as described above, to try to establish that the object is not redundant. The member can categorize or identify a Public object and the member's identity will be associated with the new object. In some embodiments a member may be enabled to moderate content associated with the new object by other members.

If the member selects Restricted as a classification, the member can categorize or identify the object, the member's identity will be associated with the new object, and the member may restrict what other members may interact with the object and may view and moderate any interactions.

Figure 3:
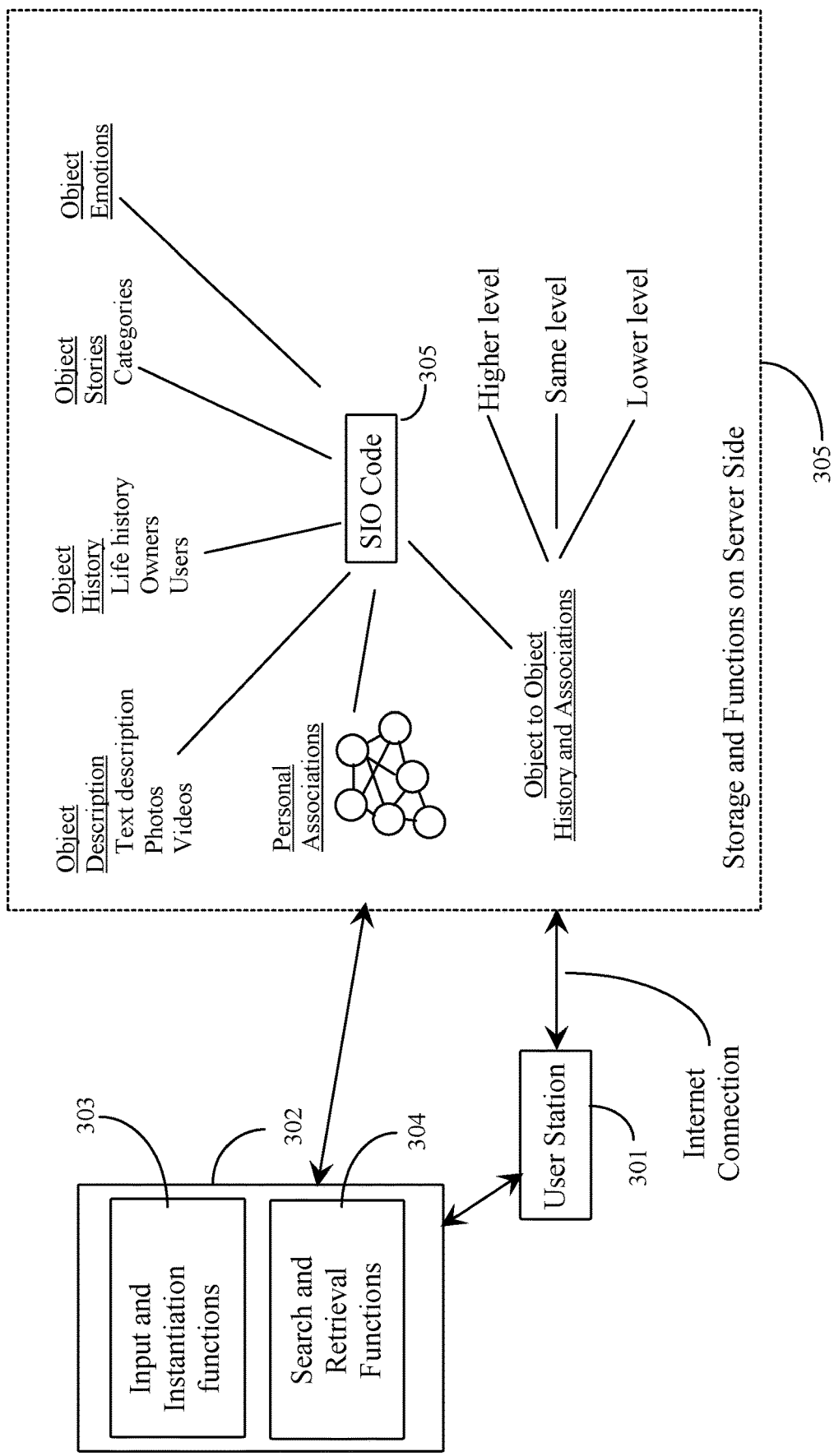
FIG. 3 is a diagram demonstrating how instantiated objects may be related (associated) in an embodiment of the invention.

FIG. 3 is a diagram demonstrating how instantiated objects may be related (associated) in an embodiment of the invention with such as people, other objects, stories and much more. A user station 301 is Internet-capable, and shown connected to an Internet-connected service 305 in an embodiment of the invention. A registered user at station 301 has interactive windows provided by software (SW) 302, which may in one alternative be executed at the user's station, as provided by service 305, or in another alternative may operate a browser application wherein services and functionality are provided from the server side through interactive pages accessible through the browser application. Functionality through SW 302 is roughly divided into two categories: Input and Instantiation functions 303 and Search and Retrieval functions 304.

As is described above, every object, virtual or physical, that is instantiated by a registered user has a unique SIO code 305. Referring back to FIG. 2, when a user instantiates an object in the system, at step 204 the user enters information about the object. At this point the information is used by the system to determine if the object already is in the system with an SIO code. But after the code is assigned, the information is categorized, stored and associated with the code. Further, after a code is assigned the same, or in some cases other users, may add to the information regarding the object.

In one embodiment at step 204 an interactive guide are provided to the user to guide the user in submitting the minimum information that allows the system to properly determine whether the object is already in the system, and to adequately describe the object at a minimum when an SIO code is assigned. The user may be prompted, for example to respond as to whether the object is physical or virtual, whether the object, if physical, is an assembly of other objects that may be in the system, or may be entered in the system. Other prompts may be provided to further categorize and describe the object. The user may be prompted, if appropriate, to provide images or videos to help describe the object. There may be a step in this process wherein the system determines that the object is, in fact an assembly of other objects in the system, or is an element in an assembly in the system as an object having an SIO code.

There may be a broad variety of types of information about objects that may be entered by users or determined by the system. As shown in FIG. 3, storage on the server side may have rich description of the object, history of the object, which may include owners and users and association with times and time windows, stories about the object, wherein the stories may be categorized as well, people associated with the object, and people associated with people associated with the object. The personal associations will in many instances be a rich matrix of threads. There may be as well object to object associations, such as described above, where an object is an element of an assembly of objects, or is itself an assembly of other elements as objects. The diagram of FIG. 3 is exemplary, and is meant to represent as association that may be far more extensive that that shown.

SW 302 in FIG. 3 is shown to include functions 303 for a user to input information, always related to an object, and to instantiate objects in the system. These input and output functions operate together in many ways. For example, a user may connect to the system to find an object in the system. The user may search for an object through entry of an SIOO code, or by keywords related to any of the categories in the system. As a single example, a user may elect to look for stories about race horses. The system might return a list of such stories much as might be returned by Google, but from the system's data storage facilities rather than the Internet. The specificity in this list will depend on the detail of the search criteria entered by the user. There may be rich interactive guidance provided by the system to provide specificity.

Every story about a racehorse in a list that is returned will be represented simply as a title, or a few words or lines at the beginning of the story, or perhaps by a synopsis of the story. Every item in the list will be interactive for the user to go to the story and read it, or hear it recited, or watch it as a PowerPoint or as a video or movie, depending on the nature of the story as entered by a registered user, and associated with an object by an SIO code. In addition to access to the stories of the nature sought, the items in the returned list will be interactively associated with the SIO code, hence the object, to which the story is associated. This association with the object of the story may be to more than one object in a descending order of strength of association, led by the object and SIO code to which the story was originally entered. This is because a story, once entered, may be associated by the system or by a user with other objects, and also because the strongest object association may have association with other objects as well.

It may be seen, then, that there are a multitude of entry points into the associated storage at the system, and any entry may lead to a wide variety of destinations, leading to still other destinations. In this single example, the user entered the matrix of associations by seeking stories about racehorses, but a user might enter by seeking an SIO code, perhaps found physically affixed to an object, which will lead by another choice of many paths to many other sorts of information.

In one embodiment of the invention the associations, indicated by simple lines in FIG. 3, may have a range of strength, which may be by increment or by quantification in a preprogrammed range. Association strength may vary, for example between 1 and 100, either by integer, or by decimal numbers. In navigating through items of information associated with one another and with objects having SIO codes the strength of association may be one means of determining by a user where to go next after once entering the data repository through a search.

As described above, users may add information and associations to the data repository under certain circumstances. In one embodiment information entry may be closed for a particular SIO, or restricted, perhaps by the registered user that instantiates the object. In some instances the instantiating user, or another user designated as an administrator for certain SIO codes, may review and filter information added by others, and may have ability to block or to alter and edit information entered. In one embodiment there are queues for newly entered information, which may be provided to moderators for review before being released in to the associated data for use by others.

One particular circumstance in which entry may be restricted is in the instance of instantiation by a user of a virtual object. This may be, for example, a fictional character or fictional object imagined (authored) by the instantiating user, and may be offered for interaction to other users only in a managed way by the instantiating user. A simple example might be a love poem authored by one user, instantiated with an SIO code, associated with other poems, works of art and people, perhaps, that the original author might open to amendment or addition by other user poets, in which the original author may be the sole judge of what addition or change might be made. One may imaging, as another example, that one user may start a fictional story with a character, and enter a first chapter, after which the story may open to other users to refine or add a character, to enter a second chapter, or a number of separat5e chapters, wherein a story may branch off into a wide variety of different stories by input of other users, or a single story may be jointly developed by a group of users, who may associate by agreement, and who may have discussions as to where the story may go next.

The last example opens another important point, which is that registered users in the system will typically have a user profile, perhaps with an alias and with real or hidden contact information, such that users may contact one another and interact in a wide variety of ways through the system. In some embodiments such interaction is entirely within the system of the invention through an internal text or messaging mechanism. There may also be ability by user permission, for some users to contact other users outside the mechanisms of the invention.

In a rather broad statement of the invention, in some embodiments a unique identifier, such as a mark or sequence of numbers, letters, colors, sounds, shapes and/or combination thereof that is attached to any inanimate object (physical or metaphysical) and used to humanize it as a digital social being and or digitally connect to other objects or people. This includes an object's history, its characteristics, characteristics others have assigned, personality and who it has been connected to and who is currently connected to the object.

In one embodiment entry by a registered user enables that user to search and browse through all of the content of the system, by SIO code or by other characteristics of information, following lines of association to other items of information, people, timelines, and more, all associated in the system. In some other embodiments the system is filtered for particular use cases. As one example, collaborative authorship or creation of other items of art may be a specific use case, in which associations to objects and people might be confined to just collaborative novels, to just collaborative poetry, and so on. There may be a configuration interface for a user to invoke filters to just particularly desired subject matter.

Entry into the system was described to some extent above, such as by invoking a search interface in a number of ways. It was described that a user might simply enter an SIO code that is known to that or another user, or might be affixed to an object in some manner. There will be, in alternative embodiments a considerable variety of ways SIO codes might be entered. In some cases one might simply image an object having an affixed SIO code, enter that to the system, and the system will translate the code and connect to the unique object associated with that code. Such a code might be a bar code, a QR code, or a pattern of dots burned into a surface, for example. Once the system associates the entered code to the unique object associated with that unique code, all of the associations of various sorts and strengths are open to the user having entered the code, and the user may then ascertain all sorts of information, such as history of the object and people associated with the object.

A tree may be instantiated as an object by a registered user. The tree may then be cut down, milled, and turned into other objects which may in turn by instantiated in the system of the invention. Other objects may be, for example, furniture, which items of furniture may be associated with the original tree object, with the person who cut down the tree, with the lumber mill that milled the tree into useful planks and such like. A filter in place may limit access to associations that begin with the felling of the tree, or may go back further to when the tree was planted, for example.

A building as an object may be instantiated with an SIO code as well as other objects and people in or associated with the building and a neighborhood or borough, city county, or state where the building may be known to reside. A user may find the history of the building, what businesses were started there, who started them, when they started, what objects were used and who used them.

A ship in a mothball fleet may be instantiated, along with items in the ship, and objects like a flotilla or geography including the ship. The ship may eventually be scrapped and portions of the ship may be made into cell phone cases, which may be associated back to the ship.

A book may be instantiated—read by my father—then by my mother—and so on. Through search a user might discover who has read THAT book, history of those persons, people who have read similar books, and other associations of various strength may be followed. Associations may be made to similar books by genre.

Geographic locations may be instantiated with information entered and associated as to what people have been at this location, what history may have occurred at a location, and more.

An occasion, a happenstance may be instantiated and assigned an SIO code. For example, a person proposes to her sweetheart at a particular location. That occasion is associated with other people and other occasions that are linked by intersection with the occasion.

A celestial object like a planet or a star, or indeed a galaxy, may be instantiated, and information may be entered of many different sorts, such as relative placement in the universe relative to other celestial objects, as well as age, prognosis for super nova, brightness, and much more.

Items of pottery may be instantiated and associated with artisan, other artisans, type, art genre, availability, age, and much more. Other sorts of artwork, such as paintings, may be instantiated with association to a great deal of information, such a water-color or oil painting, brushes used, similarity to works of other artist, people who have seen a painting, emotional reactions by persons to a painting, and so on.

An instantiated relic from the French Revolution might connect people to the history and the people who fought there as well as everywhere that relic has been and who has connected with it, and also with the many stories of the revolution.

A particular seat at a sporting event might be instantiated with an SIO code on the seat. Associations may be made to actions that seat has witnessed. A home run may have landed there. Someone has had season tickets in that seat and many people have sat there over time.

Groups of people, like the Rolling Stones as a band may be instantiated, and quite rich associations may be made to performers, persons in audience at various times, type of music, music history and repertoire, and so on.

Figure 4:
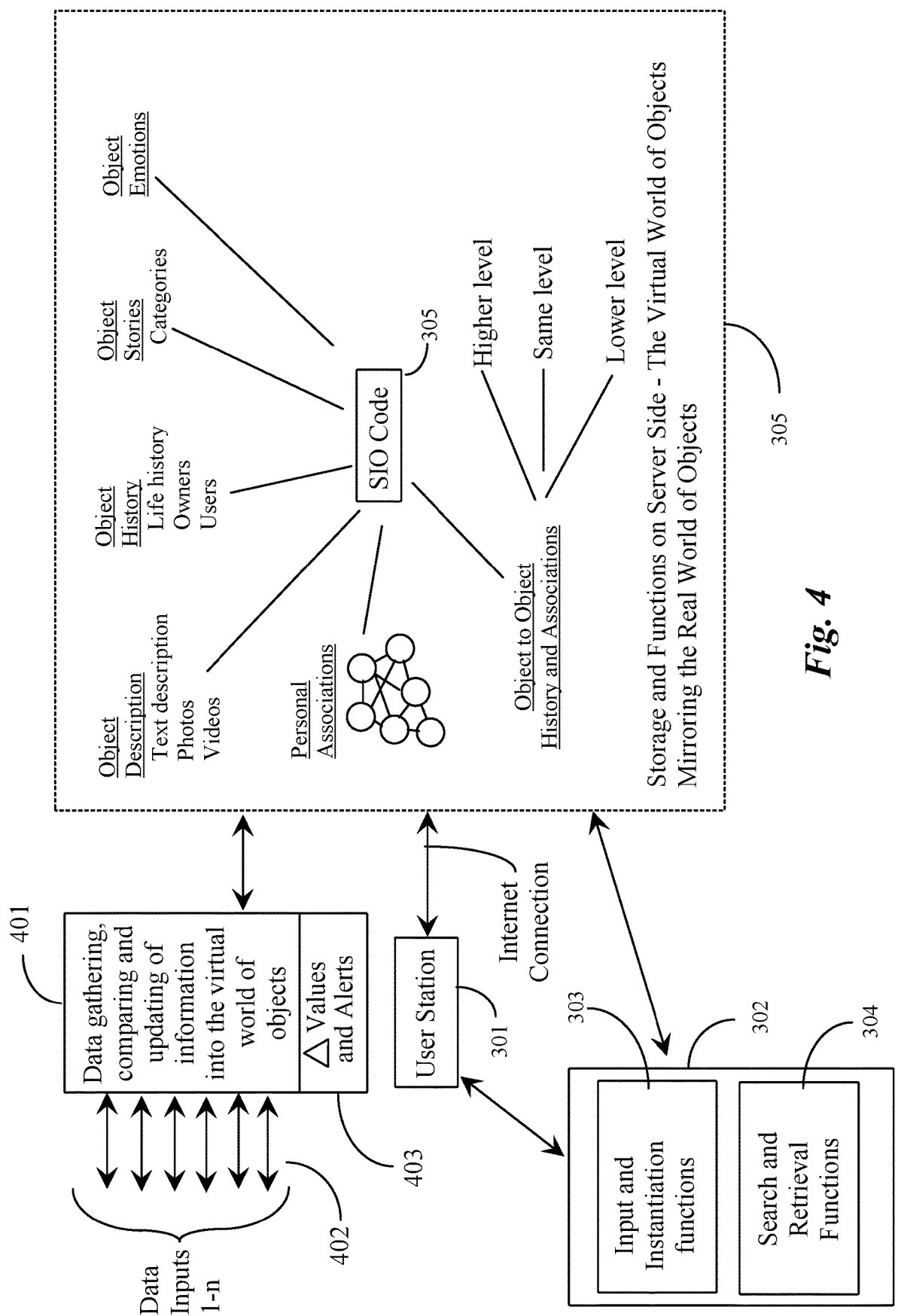
FIG. 4 is a diagram illustrating architecture and functionality in yet another embodiment of the invention.

FIG. 4 is a diagram illustrating architecture and functionality in yet another embodiment of the invention. FIG. 4 is similar to FIG. 3 in that the service 305 of the invention is illustrated, but labeled as a Virtual World of Objects Mirroring the Real World of Objects. It is true that many objects instantiated and associated with an SIO code in the virtual world may be insubstantial and objects in only a broad sense of the word. For example, it is permissible for members of the service to enter and instantiate objects that me be purely imaginary, like Superhero characters. A substantial subset of the virtual world of objects instantiated by members are virtual entities mirroring real-world entities. A member, as one small example, may enter and instantiate an automobile as an object in the virtual world; not a fantasy automobile, but an automobile owned by the member and driven on a daily basis. In such a circumstance the automobile in the virtual world, associated with an SIO code, becomes a virtual associate of the object in the real world.

In the circumstance just described regarding virtual objects and their association to real objects, the virtual objects are data points in a database, associated with stored information that in many cases is entered by the original member that instantiated the object, and that may have a great deal of associated information added by other members. The real objects in the real world have space and time reality that the counterpoint virtual objects do not have.

System 401 illustrated in FIG. 4 is a system comprising hardware, one or more memory elements, and one or processors executing coded instructions. The hardware includes a plurality of input feeds 402 labeled 1-n, and a data connection to the virtual world. Input feeds 1-n may be drawing information from a variety of sources, such as a Global Positioning System (GPS) Device in an automobile that may have been instantiated into the virtual world. At the time of instantiating the automobile the member doing so may have access to selections enabling tracking of the automobile. That is, the member may be presented by the system with a configuration interface wherein the member may identify a GPS device (the one in the car).

With GPS enabled for the car that is instantiated, system 401 will look for signals from the GPS through one of feeds 402, and finding same will update information associated in the virtual world with the virtual object mirroring the car, so that real-time position (space and time) for the virtual car may match real time position of the actual car. The virtual world car now has time and position of the real world car.

The car example provided just above is but one small example of the sorts of information that may be anonymously collected by system 401 and stored into the database defining the virtual world. System 401 may monitor news releases and broadcasts, and parse such for references to objects that have counterparts in the virtual world. This collected intelligence may be added to and associated with the counterpart objects.

Another part of system 401 is subsystem 403, which provides delta values and alerts. In the example of the car above, as GPS is tracked for the car, new time and position information may be developed, and reports may be made to the owner of the car that the car has moved twelve miles SSE, for example, in a time delta of 30 minutes. Members may be able to configure their own profiles and system functions to provide alerts in certain cases. In this manner circumstances in the virtual world may be kept relatively close to circumstances in the real world.

Figure 5:
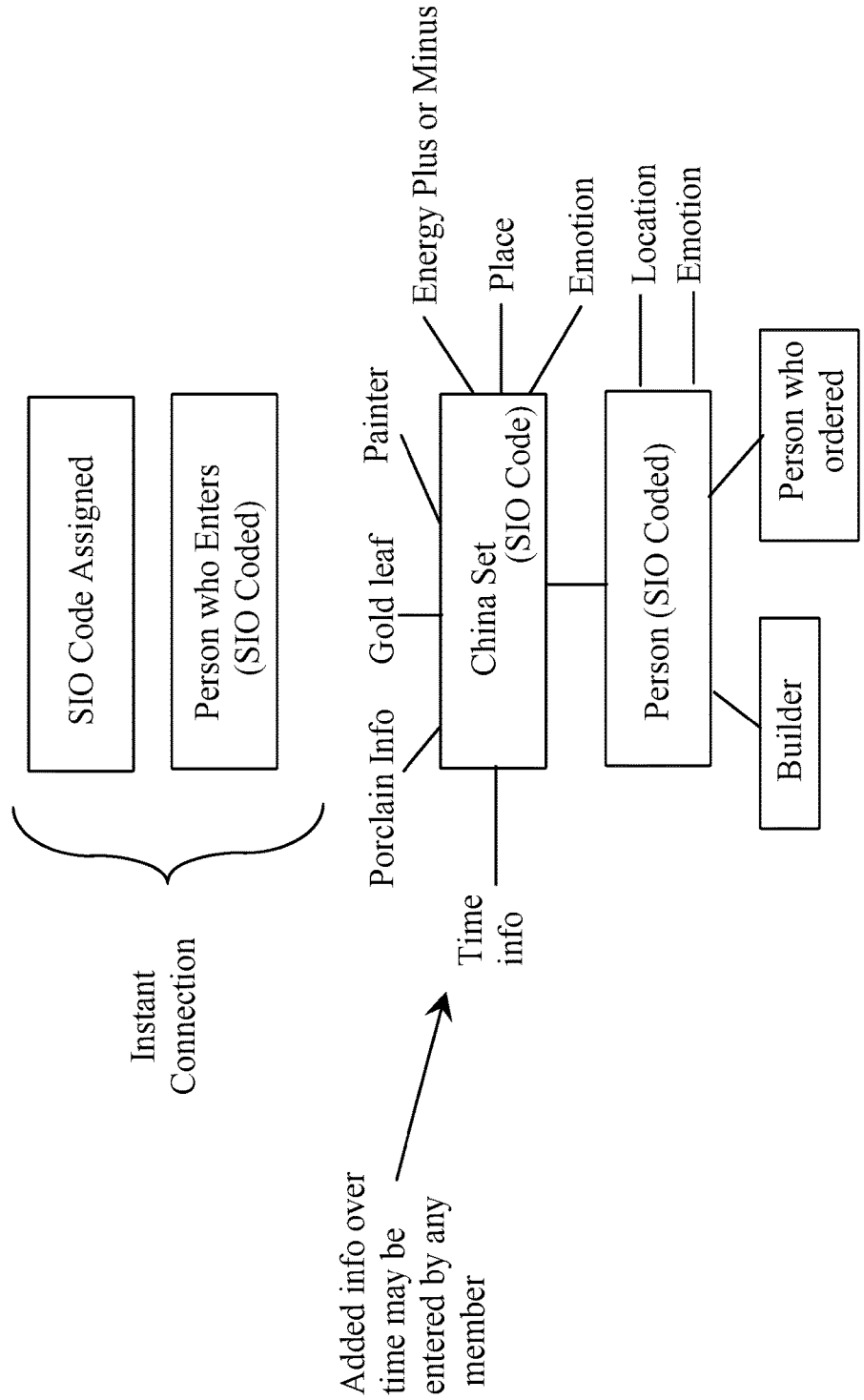
FIG. 5 is a diagram similar to that of FIG. 4 as more specific example of instantiation in an embodiment of the invention.

FIG. 5 is a diagram similar to FIG. 4A showing how adding a new SIO code might work as related to grandma's china, as a more specific example of instantiation of an object and association of the object with other objects and people in a more specific situation. FIG. 5 illustrates how one SIO coded object relates to another to give an idea of how broad is the use of object instantiation. Configuration at time of instantiation and afterward connects the set of china to a person, both of their histories, locations, the parents and person who gave birth to the individual making the china as well as the parent of the person getting the china.

Figure 6:
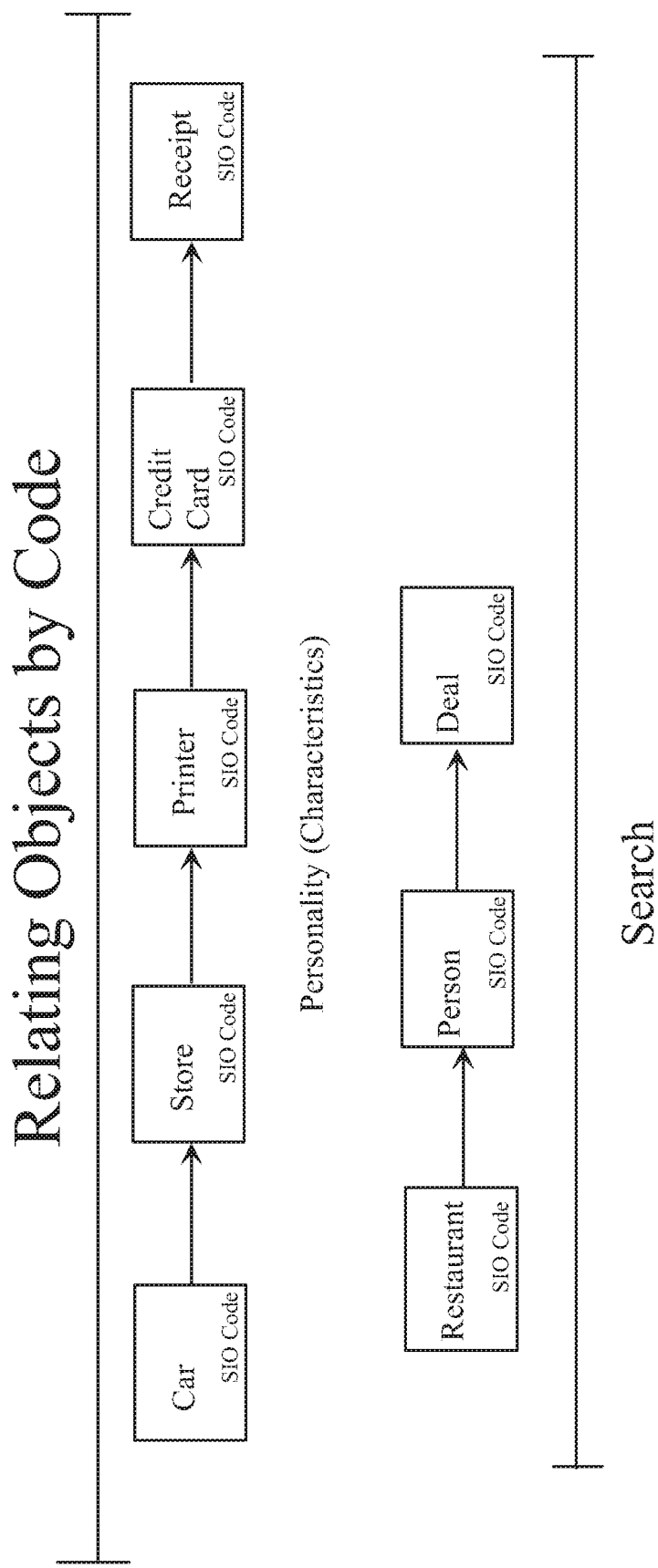
FIGS. 6 and 7 illustrate an example of how the system may tie SIO codes together in a virtual world in an embodiment of the invention.
Figure 7:
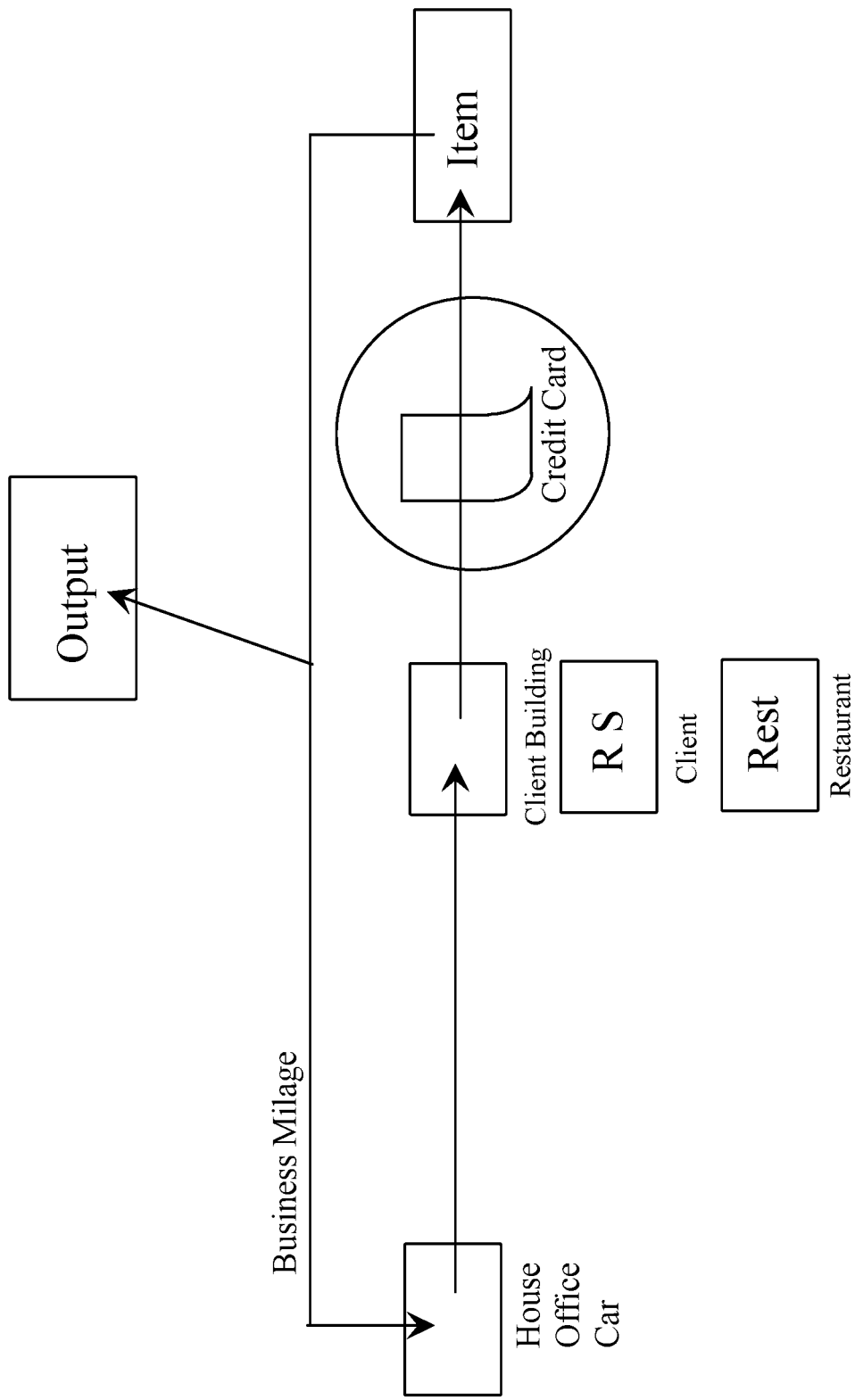

FIGS. 6 and 7 illustrate an example of how the system may tie SIO codes together in the virtual world. The idea of an individual car, a store, an item in the store, a credit card, and a receipt all having SIO codes in the real world, when brought together create a relativity that may be recreated in the virtual world to make automatic direct associations that can be used to fulfill a requirement by other systems in the real world. This example shows how all that information of where a car was located, who was in it, when it left, how far it went, to what location, what the person purchased, the credit card they used, a copy of the receipt and their return drive can be reproduced in the virtual world to interface that data with an accounting software package in the real world to automatically input business transaction and mileage. Ability to determine and associate SIOs in both the real world and our virtual world also enables making available predictive analysis and real time searches. The diagram shows such searches and predictive analysis:

What restaurants in an area are used for business deals?
Is a store more of a consumer store or business?
What are the average distance people will drive to purchase a printer?
What is the carbon footprint of purchasing a printer versus having it sent to you?

Figure 8:
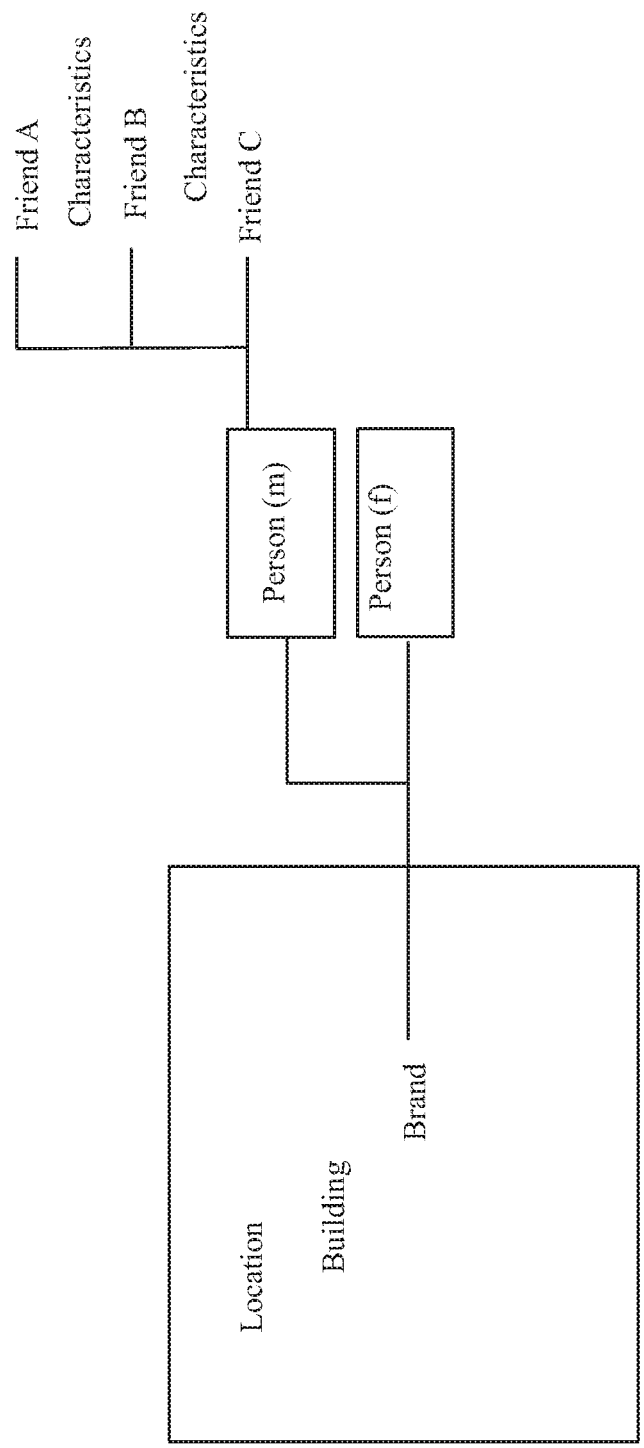
FIG. 8 is a drawing showing a potential hierarchical system of SIOs in both the real world and a virtual world in an embodiment of the invention.

FIG. 8 is a drawing showing a potential hierarchical system of the SIOs in both the real world and virtual world. In this model, the Location data table represents the "parent" part of the hierarchy, while the Building represents the "child" part of the hierarchy. To move farther down the control system, the Building data table represents the "new parent" part of the hierarchy, while the Business 1's SOI located in the building, Business 2 SOI's located in the building, represents the "child" part of the hierarchy. And it continues creating parent—child relationships as more relationships are made to the SOI's. In contrast to typical tree structures, in this model each SIO can be a child or a parent at the same time to different SIOs.

Figure 9:
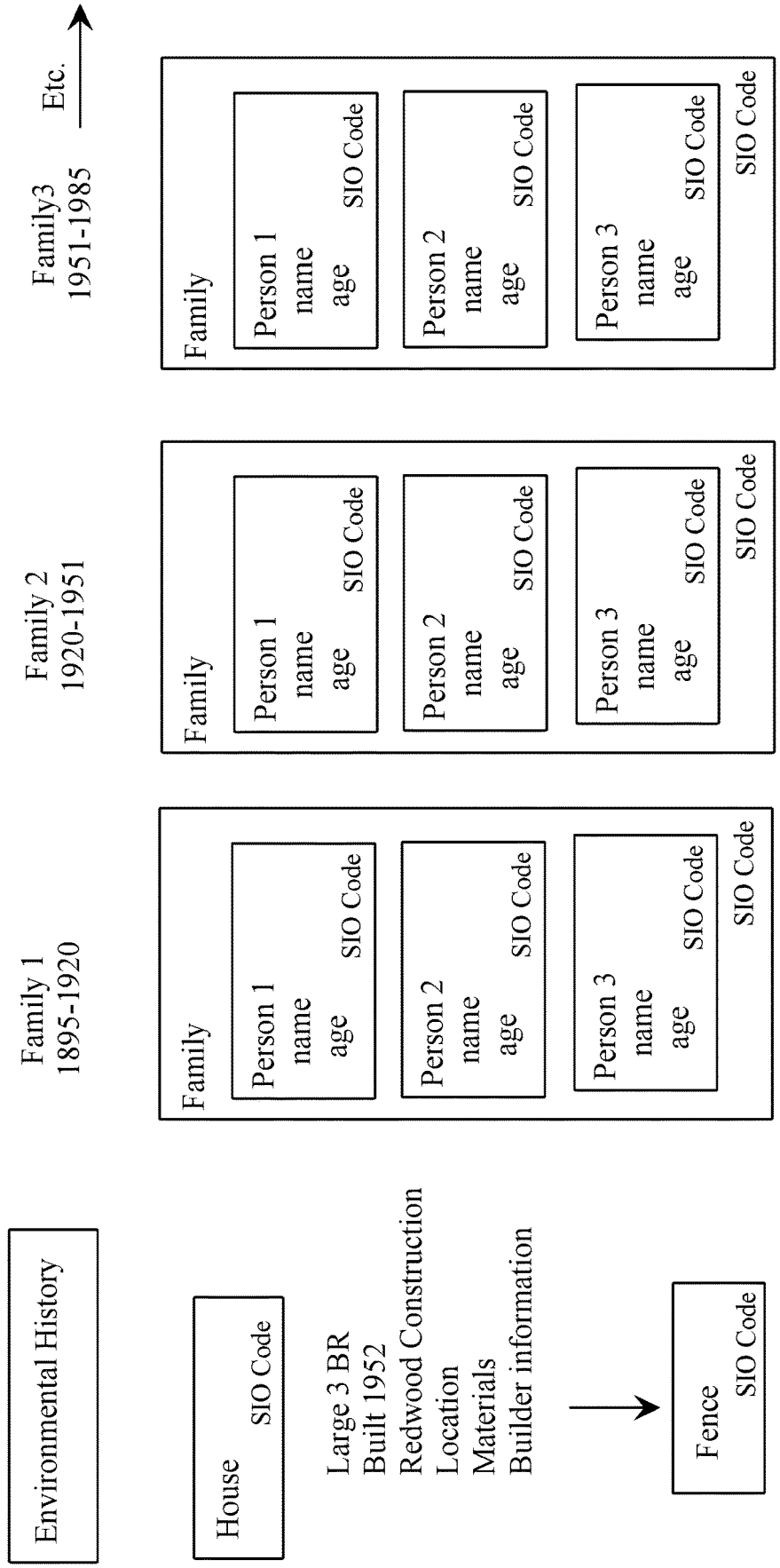
FIG. 9 illustrates how the system in an embodiment of the invention can potentially tie SIO codes of different families living in a specific home over a period of time.

FIG. 9 is an example of how the system can potentially tie SIO codes of different families living in a specific home over a period of time. The ability to follow the history of a home, when it was built, the people that lived in the home and where each of these people are now is not available today, but it can be available in the virtual world. Even the items that were and are in the house can be instantiated, assigned SIO codes, associated hierarchically with a wealth of information, and be tracked and found or verified if needed.

Figure 10:
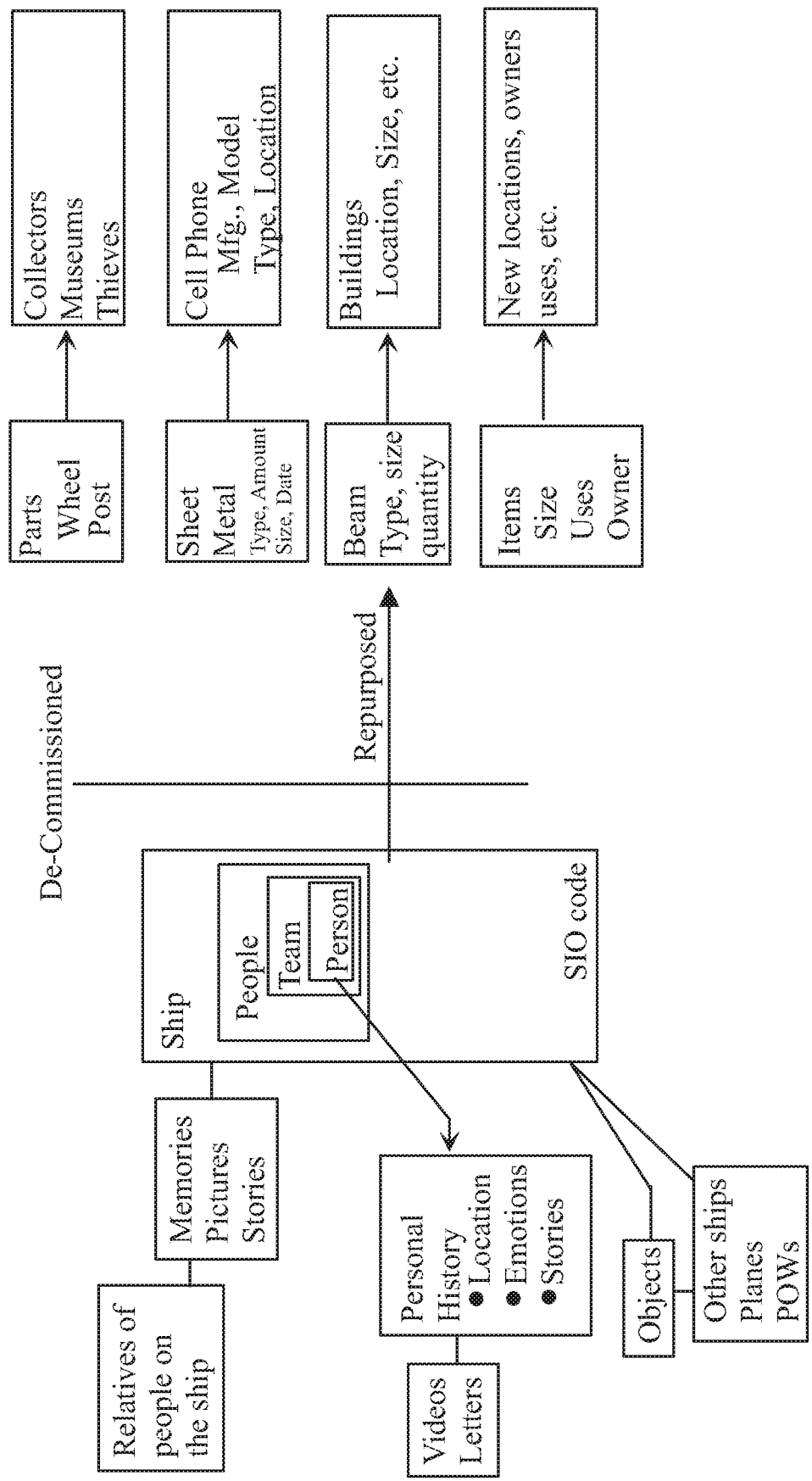
FIG. 10 is a diagram of a complex object having an SIO code showing how one SIO code can resolve into many SIO codes.

FIG. 10 is a diagram of a complex object having an SIO code and how one SIO code can transition into many SIO codes. The example illustrates a ship that was built in the 1950's. The diagram shows how the ship, the people in the ship, the parts of the ship can all have SIO codes and histories. In this example after the ship is put out of commission, each of the parts can be issued a separate SIP code and these can be tracked. If the ship was dismantled the parts can be repurposed and used to make different items. Each type of item if it were to go to different manufactures could be tracked as it is made into parts, sheet metal, iron beams, and blocks of steel. If it was then used to make cell phones, went to a collector's museum, used to make a skyscraper, or melted to make a gun—the entire history of all the SOI could be tracked at different time in their history.

Who was on the ship?
When was the ship built?
What battles was the ship involved in?
My cell phone carries the metal used in the 1950 Destroyer that survived all attacks that Robert Harris was on.

In another important aspect of the invention a very sophisticated statistical ability is provided whereby the nature of objects, associations of persons with objects and objects with objects, including thoughts and emotions entered by persons about objects, and personal characteristics and profiles of persons with objects are tracked relative to time, and periodic snapshots of segments of the database may be made, and analyzed in a wide variety of ways, with statistical representations of such snapshots made available, either publically or in a restricted manner. Segment definition may be made in real time in a search facility, and any one or more of a wide variety of algorithms may be called to provide statistical output relative to one or more segments. The algorithms available for statistical analysis may be created in real time (on-the-fly) as well.

As perhaps a rather simple example, a member may be authorized by the system to seek statistical output by defining a segment as all instantiated objects that are commercial cruise ships over a particular tonnage and belonging to any of three commercial cruise lines, and analyze information in the system as to, for example, how many persons of a particular ethnic origin and above a threshold income level booked passage on these cruise liners in a particular two-week time window of the previous calendar year.

As another simple example, the segment may be limited to a single painting hanging in the New York Metropolitan Museum of Art, for which persons who are associated in the database with this painting have entered emotional reactions to this painting at various times. The query in this example may be to track how emotional reaction to this painting may have changed over a prescribed period of time over the totality of people associated with the painting and who have entered such opinion, and how reaction may have changed depending upon one or more of age, ethnicity, gender, height weight, hair color, or any other characteristic of such persons that may be available in personal profiles of the persons in the system. Characteristics of course may be combined in different ways in different interrogatories in such analysis.

The skilled artisan will recognize that such statistical ability combined with search criteria, segmentation criteria, and the great deal of information and variety of associations in the system provides a very valuable tool for personal, private and commercial analysis, that may be leveraged in many ways by an enterprise hosting such a system.

In some embodiments of the invention, related to statistical tracking and reporting, information associated with one object may be automatically associated with one or more other objects as well. This function enables a member, for example, to enter information about or for a specific object, which information may be then associated with all objects that share a particular characteristic with the specific object.

In one aspect of the invention it is important to understand, as described in different places above, that an "object" in the concept of the Social Identity of Objects as described in many aspects in this specification, is not limited to objects having physical reality. Any identifiable entity that may be expressed as a noun in language may be an instantiated object in this SIO concept. There is no general agreement, for example, that religious figures have physical reality, although many believe that they do in many cases. So, as a very broad definition, if you can imagine it and name it, it may be instantiated as an object with an SIO code in the SIO database. Many such objects may have mostly verbal or textual descriptions associated in the SIO dB, but may also be linked to art works, sketches or pictures, for example, provided by the instantiating member or others, according to each person's understanding of the nature of the object, whether real or imaginary, regardless of opinions as to whether an instantiated object is real or imaginary. Again, any entity that may be imagined and named, for which a description may be provided, may be instantiated in the SIO system and assigned a unique SIO code, and that object may be associated in a number of ways with the person who initiates the instantiation.

One very important instance of object instantiation has to do with the Internet network and the vastly interconnected instances of information sites, termed nodes or websites, each of which typically has been assigned an IP address and a URL comprising a domain name, that uses that IP address to connect interested people in the Internet network to individual ones of such nodes. It is well known in the art that persons operating Internet-capable appliances may execute browsing applications, like Google for example, and may connect to such information sites by asserting a URL, or in some cases an IP address directly, and may use interactive interfaces presented by the browser program in interaction with website, to access information and activities and services provided by the website, including further navigation to pages in the site and other sites. This, of course, is how the SIO system works as well.

In one embodiment of the instant invention a person may, through procedures described above, instantiate a website in the Internet as an object in the SIO system, assigning a unique SIO code to the site that is different from the IP address or URL of the site. The instantiating person may enter description of the site, which may include the IP address and the URL, or multiple URLs associated with the site, and any other description that may be associated with each such site in manner as described above.

The description above regarding websites may be extended to nodes in the Internet of Things as well, with different nodes in the IoT being instantiated as objects in the SIO system, each with a unique SIO code, such that such network objects may be related to people and other objects in the SIO system in the many ways described above.

In one embodiment of the invention the population of Internet sites instantiated in the SIO system by SIO code may be accessed through the SIO system by asserting the SIO code, which automatically in this embodiment asserts the URL and/or IP address. In various embodiments of the invention the SIO system may crawl the population of Internet sites in the SIO system, and may cache sites by various criteria, including textual, audio and image content, and search and browse functions may be provided in very specialized ways to facilitate enhanced search functions for members of the SIO system.

The skilled artisan will understand that the descriptions made above, some with reference to particular figures and elements in figures, are all exemplary of the architecture and functions that may be provided in embodiments of the invention. There are many other objects and sorts of objects that may be instantiated in the invention, and many functions in entry, search browsing, editing information, and such like that will fall within the spirit and scope of the invention.

The Social Identity of Objects is comprised of an object's continual positioning in time and space, it's appearance, relationships with other objects and the interactions with or effects on human and non-human entities.

The software that executes on the Internet-connected server that enables instantiation of objects is termed Socrates by the inventors. The software in various aspects of functionality also enables instantiation of SIO data for each object in the system, and recommends data based on time, place, space, written tags, photos, videos, descriptions, commonality, and emotions to be displayed through an interface, among other functions described elsewhere in this specification.

The SIO code is attached to or associated with each object, whether it be physical or metaphysical and is used to reference the object when new data associated to the object is received or communicated.

In the system no two objects are exactly the same. From the time they are instantiated they are, by nature, their own individual object and have their own specific set of attributes. Much of this differentiation is caused by human, planning, design or interactions, but some can be created in the virtual world as well. This model of creating social identities for objects may have a significant impact in quests for understanding and exploring virtual reality and artificial intelligence as well as enrich existence for persons interacting with the system, and the objects in the system and counterparts in the real world.

The invention claimed is:

1. A social identity system, comprising:
a structured, network-connected data repository storing a plurality of data objects;
a network-connected server coupled to the data repository and having a processor executing software from a non-transitory medium, the software providing interactive interfaces to registered members operating network-connected computerized appliances, each member, by registering, automatically associated with a single, unique social identity object (SIO) code as a unique personal data object in the social identity system;
a plurality of data objects, other than personal data objects, stored in the data repository, each created by a registered member through one of the interactive interfaces, each created data object representing either a physical object in the real world as a physical entity data object, or a virtual object having no physical presence in the real world, as a virtual entity data object, each data object created automatically associated with a single, unique SIO code, an object name and an original description entered by the member creating the data object, each data object created associated uniquely by SIO codes with the registered member creating the data object;
a broad variety of image, textual and audio information, stored in the data repository by the registered members, associated automatically, when entered, with a SIO code, and associated by the member entering, by SIO codes with individual data objects and other registered members, wherein the broad variety of image, textual and audio information defined by association with a particular data object comprises one or more of a place in time and space, a history, ownership if applicable, provenance if applicable, stories and opinions constituting human memories and experiences regarding the member, physical object or virtual object represented by the data object, the stories and opinions associated by identity codes with members contributing the stories and opinions, the changing collection information over time defining an evolving social identity of the member, physical object or virtual object represented by the data object; and an objective search function provided through the interactive interfaces, enabling members and others to enter search criteria to find names and original descriptions of data objects, and individual instances of the image, textual and audio information associated with data objects as social identities wherein SIO codes are unique across all instances of registered users, data objects, and instances image, textual and audio information associated with data objects.

2. The system of claim 1 wherein the search function further enables members and others to discover associations of data objects with other data objects and with other members.

3. The system of claim 1 wherein the SIO codes of data objects representing physical objects that are collections of other constituent physical objects are related hierarchically to the SIO codes of the constituent physical objects.

4. The system of claim 1 wherein addition and deletion of image, textual and audio information to the collection defining the social identity of a data object is controlled by permission from the member originally creating the data object.

5. The system of claim 1 wherein social identity collections, and portions of social identity collections may be downloaded by permission of the member originally creating the data object.

6. The system of claim 1 wherein a physical object associated with a data object in the social identity system may have a representation of the SIO code attached to the physical object.

7. The system of claim 6 wherein a user may enter the SIO code attached to a physical object into the social identity system through an interactive interface, and access thereby the name, description and social identity collection of individual instances of image, textual and audio information associated with the data object, and therefore with the physical object.

8. The system of claim 1 further comprising functionality enabling the system to update stored information about data objects automatically.

9. The system of claim 1 wherein a substantial plurality of SIO codes may be assigned to a data object when entered, and individual ones of the assigned plurality of SIO codes may represent the data object, and the person, physical object or virtual object associated with the data object, at different points in time after the time of entry of the data object.

10. The system of claim 4 wherein the member creating a data object is enabled to release the data object and associated information for editing by others.

11. The system of claim 1 wherein some opinions entered by members into a social identity collection of individual instances of image, textual and audio information associated with a data object assign one or another human emotion to the data object, and therefore to the person, physical object or virtual object associated with the data object.

12. The system of claim 8 wherein the updating of stored information comprises tracking geographic position and movement of persons and objects associated with data objects, and updating position and movement in the stored information associated with the stored data objects.

13. The system of claim 12 wherein tracking additionally comprises tracking transactions between persons and persons and between persons and objects, and storing the tracked transactions associated with the data objects representing the persons and objects.

* * * * *